Inventors
George W. MacBride
George C. Bonney

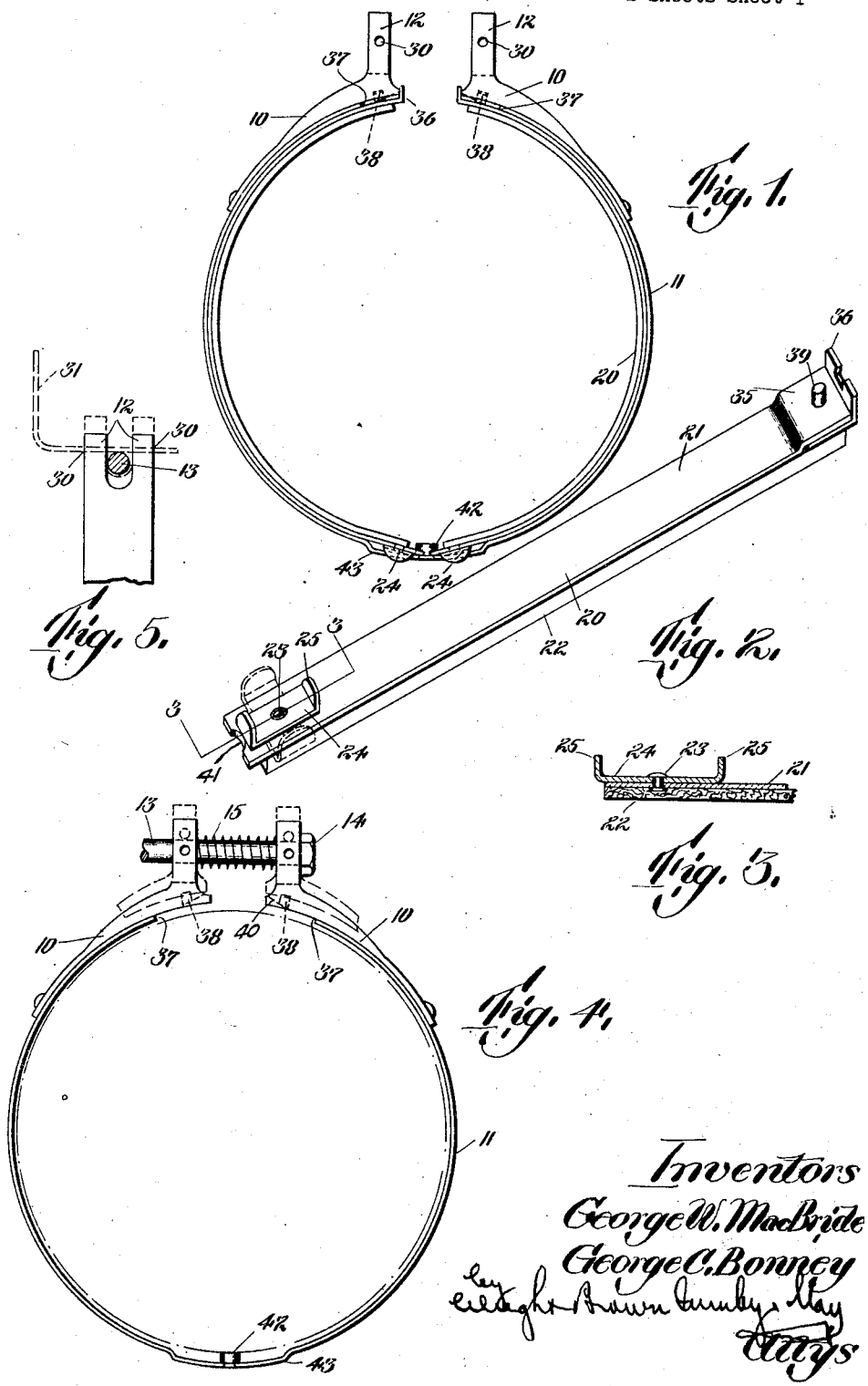

Patented June 8, 1926.

1,587,783

UNITED STATES PATENT OFFICE.

GEORGE WILLIAM MacBRIDE AND GEORGE CLINTON BONNEY, OF BOSTON, MASSACHUSETTS, ASSIGNORS TO MacBRIDE CO., OF SOUTHPORT, MAINE, A CORPORATION OF MAINE.

BAND BRAKE.

Application filed December 28, 1922. Serial No. 609,455.

This invention relates to band brakes such as are used for planetary transmissions of that type used in Ford cars and is an improvement over the construction shown in our application for patent Serial No. 557,105 filed April 28, 1922, which has matured into Patent No. 1,461,803.

According to the construction shown in the above mentioned application the lining for each band is formed in two parts or sections, each section being so constructed as to be engaged at one end within the band adjacent one end, while the latter is positioned about its drum in nearly its operative position, the lining section extending substantially perpendicularly to the plane of the band. The engaged end of the lining is then slid along the inner face of the band toward its middle, the lining section being swung progressively toward the plane of the band until it lies therein with its outer end engaging the corresponding end of the band and its inner end extending half way toward the opposite end of the band. This construction permits the lining sections to be removed and replaced through the usual hand hole in the transmission casing without disassembly of the casing or other portions of the mechanism.

The present invention provides a construction of band and lining sections wherein the adjacent ends of the pair of sections midway of the length of the band are retained in proper position thereon so that the sections will properly grip and release the drum when the ends of the band are brought together and separated, and whereby the engagement between the band and sections is so formed that the brake drum which the band embraces is not liable to injury by parts projecting from the band scoring the drum should the lining sections become worn out or not be in position.

For a more complete understanding of this invention together with further objects and advantageous details and combinations of parts, reference may be had to the accompanying drawings in which Figure 1 is an edge view of a band with lining sections applied.

Figure 2 is a perspective of a lining section adjusted in preparation for insertion in a band.

Figure 3 is a fragmentary section on line 3—3 of Figure 2.

Figure 4 is an edge view of the band and operating mechanism, the position of the band lugs when the band is adjusted for insertion of the lining being shown in dotted lines.

Figure 5 is a fragmentary side elevation of a portion of the parts shown in Figure 4.

Figure 6:
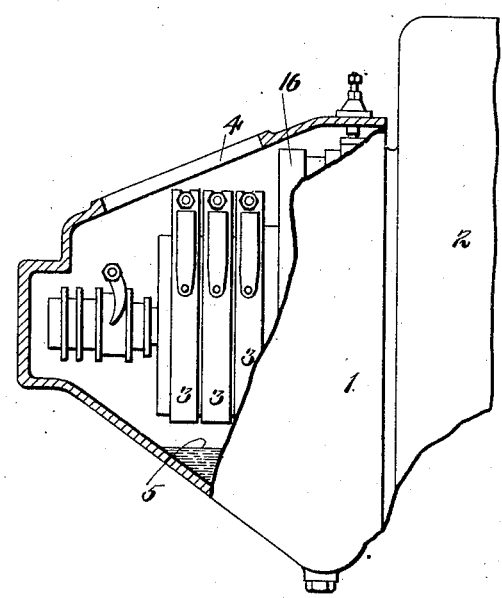
Figure 6 is a side elevation partly broken away of the transmission casing of a Ford car.

Referring first to Figure 6, at 1 is shown a casing fixed to the end of the engine frame 2 in which is positioned the usual planetary transmission comprising three brake drums each embraced by a brake band, as shown at 3. The casing 1 is provided with an opening 4 in its upper face which is designed normally to be covered by a cover plate (not shown). The lower portion of the casing is intended to be filled with oil, the level of which is indicated at 5 in this figure.

Each brake band 3, as shown more particularly in Figures 1 and 4, is provided at each end with an actuating lug 10 which is attached to opposite ends of a resilient hoop-shaped band 11. The lugs 10 have upwardly extending bifurcated ears through which passes an actuating rock shaft 13 on the outer end of which is threaded a nut 14. Surrounding each rock shaft 13 and bearing between the ears 12 is a coil spring 15 which normally urges the lugs apart to release the brake band. By rocking the shafts 13, however, in a manner well known in the art, the lugs 10 at the opposite end of the corresponding brake band are brought toward each other to tighten the brake on the drum. The band 11 is normally lined with a friction material. such as fabric, which is brought into contact with the corresponding drum when the band is tightened by actuation of the rock lever.

These linings are subjected to wear by the brake drum and it is therefore sometimes necessary to replace them. As heretofore constructed this has been a difficult operation. It has been usually necessary to remove the rock shaft 13 for which action it is necessary to remove the nut 14. While these may be removed by reaching through the opening 4 of the housing, it often happens that the nuts are accidentally dropped and lodge in the lower portion of the housing while they are inaccessible for removal through the opening 4. Other parts are also likewise liable to drop into the housing while the relining operation is being effected. The engine flywheel shown at 16 in Figure 6 is mounted to dip beneath the surface of the oil in the housing 1 and portions of the magneto also dip therebeneath. It is therefore highly important that no foreign matter, particularly of a magnetic nature, be allowed to remain loose within the casing and in case any parts have accidentally fallen within the casing, it is necessary to further disassemble it to gain access for such removal. In cars equipped with electric starters it has usually been found necessary to remove the starter mechanism in order to sufficiently disassemble the transmission casing.

By the new construction of band and linings no removal of the rock shaft or bolts 13 is necessary and no further disassembling of the casing than the removal of the cover plate normally covering the opening 4 is required. For this purpose the lining shown in detail in Figures 2, 3, and 5 at 20, is constructed of a pair of sections each of which may be inserted in position through the opening 4 of the housing. Each section 20 as shown comprises a resilient strip or backing plate 21, carrying on one face frictional material of any suitable type such as fabric as shown at 22. The opposed face of the backing plate 21 of member 20 is provided with means for engaging and interlocking with the brake band. In order that each section may be inserted in position through the opening 4 without disassembling the mechanism, provision is made by which one end of each section may be inserted into engagement with the band the section extending substantially at right angles thereto and then, while still in engagement therewith, moved partially around the inner face of the band, the opposite end of the section being pushed inwardly toward the band until the section is in lengthwise lapping engagement therewith. For this purpose one end of each lining member has pivoted or swiveled thereto by means of a rivet or other suitable means 23, a channel-shaped element 24 having outwardly directed end flanges 25 so spaced as to slidably embrace the side edges of the band 11. This channel element is swiveled so that when turned to extend lengthwise of the lining section it may be engaged with the inner face and side edges of its band the length of the section extending substantially at right angles to the band, as shown in Figure 7, the member 24 at that time engaging the band adjacent one end at or near a lug 10.

Figure 7:
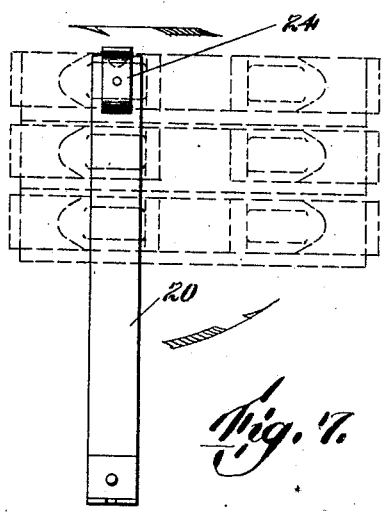
Figures 7 and 8 are somewhat diagrammatic views illustrating the operation of inserting the lining.
Figure 8:
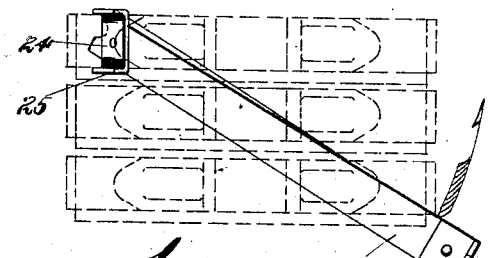

As shown in Figures 7 and 8 the lining may be inserted beneath the end of the band to which it is to be attached, as shown this being the band nearest to the flywheel which is the most difficult one to reline. To facilitate the insertion of the lining member in this position, it is preferable to provide in the bifurcated ears of each lug 10 alined perforations shown at 30 in Figures 1, 4, and 5 so positioned that a wire shown in dotted lines in Figure 5 at 31 may be passed therethrough and engage the upper portion of the rock shaft 13 to retain the end of the band in position elevated above the brake drum so as to permit ready insertion of the lining. After the lining is inserted the wire 31 is removed since it has no function except in assembling and disassembling the parts. The raised position of the lugs 10 is indicated in dotted lines in Figures 4 and 5. The end of the lining member to which the channel 24 is attached may then be moved downwardly about the transmission while the opposite end of the member may be swung inwardly, as shown by the arrows in Figure 7 toward the position indicated in Figure 8. By further sliding motion the lining member may be moved into its final position extending half way around the band. A pair of lining members are slid into position from opposite ends of the band so that those ends of the members having fixed thereto the channel guides 24, are adjacent, while the opposite ends of these members lie beneath the lugs 10.

In order to retain the ends of the members in position each one has fixed thereto an element 35 preferably having its end turned upwardly at 36 to engage over the inner end of the lug 10 as shown in Figure 1. In order to provide a suitable seat for the element 35, the band 11 may terminate back from the inner end of the lug 10 as shown at 37 (Figures 1 and 4) and further to form interfitting or locking connections from the upper ends of the lining members, each lug 10 may be provided with a socket 38 in which may be seated a boss 39 projecting from the element 35. A guide groove 40 preferably leads from the end of the lug 10 to the socket 8 to guide the boss 39 thereto. The opposite ends of the sections which are adjacent each other the mid length of the band are held in correct position relative to the band by forming in the adjacent ends of the backing plate 21 notches 41 engaging on opposite sides of a pin or boss 42 projecting inwardly from the band. In order that this boss may not engage the surface of the brake drum and score it, should the brake sections have been removed or have become badly worn, a portion of the midlength of the band as at 43 is outwardly offset so that the inner end of the boss is spaced from the drum even when no lining section is in position. This offset portion is of sufficient length to permit the ends of the backing plate 21 to firmly engage the boss without requiring them to be bent suddenly, hence no interference to the sliding of the lining section into and out of position is produced. By placing the pins or bosses 39 on the lining sections rather than on the bands, no elements project from the bands to interfere with the proper sliding of the sections into and out of position.

When the lining member has been placed in position the wire holding the corresponding lug 10 elevated may be removed, whereupon the resilient pressure between the lining member and the band and the proximity of the face of the brake drum prevent disengagement of the lining members and band. By the reverse process, first raising the lug 10 and disengaging the element 39 therefrom, and pulling outwardly thereon, the lining member may be readily slid from its position within the band and removed from the opening 4 of the casing.

Figure 9:
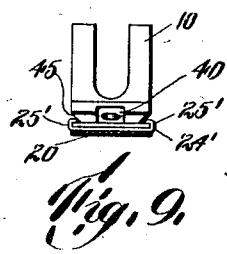
Figure 9 is an end view of a band and an actuating lug, a lining member shown sectioned being initially engaged with the band, this figure showing a slightly modified construction.

In Figure 9 a slight modification is shown in which the edges of lug 10 adjacent the band are beveled off as shown at 45 to form with the band guide grooves to receive the inturned upper ends of the flanges 25 of the channel element 24 swiveled to the end of the lining section. These inturned ends slidably embrace the edges of the band and effect a more positive connection between the section and band than may be secured by the channel element 24.

Having thus described an embodiment of this invention is should be evident to those skilled in the art that many changes and modifications might be made therein without departing from its spirit or scope as defined by the appended claims.

We claim:

1. In combination, a brake band, a sectional lining for said band, and a member projecting from said lining for engagment in a mating socket of said band to hold the band and lining correctly related.

2. In combination, a brake band, a sectional lining for said band, and means engaging the ends of the lining sections which are adjacent to each other to hold them in position relative to said band.

3. In combination, a brake band, a sectional lining for said band, and means carried by said band with which adjacent ends of said lining sections may engage to hold them in proper position.

4. In combination, a brake band for embracing a brake drum, a sectional lining for said band for engagement with said drum when the brake is applied, said band opposite adjacent ends of said lining sections being outwardly offset, and a boss projecting inwardly from said offset portion and against which said adjacent ends may bear, the inner end of said boss being spaced at all times from the surface of said drum.

5. In combination, a brake band for embracing a brake drum, a sectional lining for said band, each section comprising a backing plate for engagement with the inner face of said band and a frictional facing for engagement with said drum, and a boss extending inwardly from said band, the adjacent ends of said backing plates being notched for engagement with opposite sides of said boss.

6. In combination, a brake band for embracing a brake drum, actuating lugs fixed to each end of said band by movement of which lugs toward and from each other said band is tightened and loosened, respectively, about said drum, lining members for said band, each member being of a length to extend from one actuating lug half way toward said other actuating lug, guide elements slidably engaging said band swiveled to said members near their adjacent ends, a boss extending inwardly from said band midway between its ends for engagement with mating sockets in the adjacent ends of said members, and bosses extending from the opposite ends of said members and fitting into mating sockets in said actuating lugs.

7. In combination, a brake band for embracing a brake drum, actuating lugs fixed to each end of said band by movement of which lugs toward and from each other said band is tightened and loosened, respectively, about said drum, lining members about said band, each member being of a length to extend from one actuating lug half way toward the other actuating lug and comprising a backing strip and a facing of frictional material fixed to one side thereof, guide elements slidably engaging said band and swiveled to said backing strips near their adjacent ends, a boss extending inwardly from said band midway between its ends for engagement with mating notches in the adjacent ends of said strips, said band adjacent said boss being outwardly offset whereby said boss may not contact with said drum even when no lining members are in position, elements fixed to the opposite ends of said strips and having portions constructed to partly overlie the outer faces of said actuating lugs, and bosses carried by said last mentioned elements constructed to fit into the mating sockets in the under faces of said lugs.

8. A band brake comprising a band, a lining section, and a channel shaped guide fixed to said lining section and having the ends of its flanges inturned and slidably embracing the edges of said band.

9. A band brake comprising a band, an actuating lug fixed to one end of said band and shaped to form guide-ways between said lug and the edges of said band, a lining section, and a channel shaped guide element swiveled to one end of said lining section and having its flanges turned over to embrace the edges of said band and riding in said guideways.

10. A band brake comprising a band, an actuating lug fixed to one end of said band and shaped to form guideways between said lug and the edges of said band, a lining section, a channel shaped guide element swiveled to one end of said lining section and having its flanges turned over to embrace the edges of said band and riding in said guideways, and means at the other end of said section to interfit with said lug.

11. In a device of the character described, the combination with a drum and a band offset to form a pocket, of a lining having a guide adapted to occupy said pocket.

In testimony whereof we have affixed our signatures.

GEORGE WILLIAM MacBRIDE.
GEORGE CLINTON BONNEY.